Aug. 30, 1932.   J. C. CROWLEY   1,874,915
AIR CHUCK
Filed Aug. 13, 1930

Inventor
John C. Crowley
Kwis Hudson & Kent
attys.

Patented Aug. 30, 1932

1,874,915

UNITED STATES PATENT OFFICE

JOHN C. CROWLEY, OF CLEVELAND HEIGHTS, OHIO, ASSIGNOR TO THE DILL MANUFACTURING COMPANY, OF CLEVELAND, OHIO, A CORPORATION OF OHIO

AIR CHUCK

Application filed August 13, 1930. Serial No. 474,896.

This invention relates to an air chuck particularly adapted to be used with an air hose for inflating rubber articles such as pneumatic tires, although of course, the chuck is not limited to this use alone. The invention disclosed in the present application is an improvement over that disclosed in my copending application Serial No. 347,468, filed March 16, 1929.

Air chucks are commonly employed in connection with air pressure systems in garages, service stations and similar places and since they are subjected to severe treatment and usage it is necessary that they be strongly constructed and not easily broken or rendered inoperative. It is also important that the chuck be provided with an efficient valve for preventing the escape of air from the hose line when the device is not in use and that such valve be readily responsive to movement from its seat when the device is applied to a valve stem and to its seat when the device is removed from the stem. It is a further advantage that an air chuck of this character be formed of a minimum number of parts so that the chuck may be economically manufactured to enable it to be sold at a relatively small cost.

An object of the invention is to provide an air chuck of simple construction, formed of a relatively few number of parts, of such strength that it will readily withstand the treatment to which it is subjected in ordinary use, and which may be easily and quickly assembled.

Another object is to provide an air chuck in which an efficient valve is arranged capable of preventing the escape of air from the hose line when the chuck is not in use, yet readily unseated when it is desired to connect the chuck to a valve stem.

Additional objects and advantages will become apparent as the description proceeds.

Figure 1:
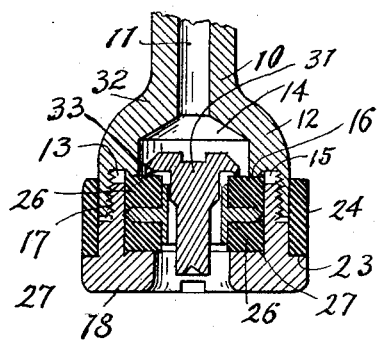

An embodiment of the invention is illustrated in the accompanying drawing wherein, Figure 1 is a sectional view through the air chuck.

Figure 2:
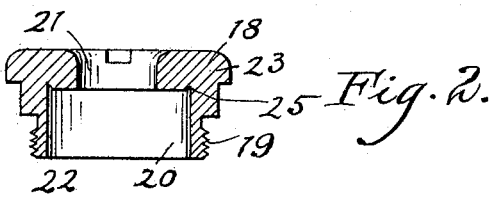
Figure 3:
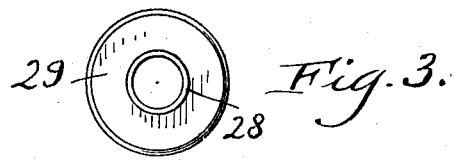
Figure 4:
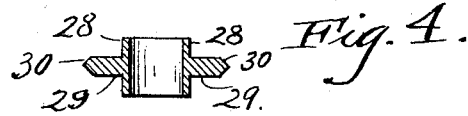

Figs. 2, 3 and 4 are detail views of certain parts of the chuck, and

Figure 5:
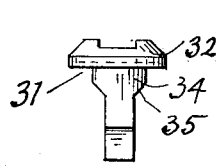
Figure 6:
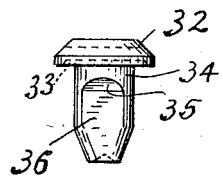
Figure 7:
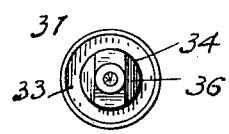

Figs. 5, 6, and 7 are detail views of the valve member, Fig. 6 being taken at right angles to Fig. 5, while Fig. 7 is a bottom plan view of the valve.

The chuck comprises a stem portion 10 which may be preferably in the form of an elbow (not shown) to enable it to be readily positioned upon a valve stem of a pneumatic tire as is well understood in the art, the stem 10 having an air passage 11 therethrough and being provided at one end with a hose connecting portion as is well understood in the art.

The chuck has at its opposite end a valve housing portion 12, the passage 11 through the stem connecting the portion 12 with the hose attaching portion (not shown). The valve housing portion 12 constitutes a chambered head, the chamber of which is formed of a pair of recesses of different diameter, the outer recess 13 being substantially larger that the inner recess 14.

An internal flange 15, at the junction of the two recesses 13 and 14, is provided with an outwardly extending pointed annular rib 16, while the wall of the recess 13 is threaded at 17 to receive a nut 18 externally threaded at 19. The nut 18 is, of course, connected to the head 12 of the chuck by screwing the same into the recess 13 as clearly shown in Fig. 1.

The inner threaded portion 19 of the nut 18 is reduced in external diameter and is provided with an annular counterbore 20 communicating with a smaller bore 21 and having an annular shoulder 22 at its base. The outer end of the nut 18 is enlarged and is provided with an outwardly extending annular flange 23 upon which a ferrule 24, shrunk or otherwise arranged upon the nut, may seat. This ferrule 24 extends upwardly beyond the upper end of the nut and is spaced outwardly from the threaded portion 19 thereof whereby when the nut is assembled with the valve housing portion 12 of the chuck the wall of the recess 13 will extend between the ferrule and the nut with the internal threads 17 thereof mating with the external threads 19 of the nut.

The shoulder 22 at the base of the counterbore 20 is provided at its outer edge with an annular substantially V-shaped notch 25 so that when an annular flexible washer 26, preferably formed of rubber and having oppositely extending V-shaped ribs 27 upon each of its circumferential edges, is seated on the shoulder 22, one of the annular ribs 27 will seat in the V-shaped notch 25. The washer 26 is of a diameter corresponding to the diameter of the counterbore 20 and is provided with a central opening smaller than the diameter of the bore 21 in the nut 18 whereby a portion of the washer will extend beyond the circumferential wall of the bore 21.

A sleeve 28 having an outwardly extending annular flange 29 located intermediate its ends is positioned in the central opening in the washer 26 with the annular flange 29 extending over and resting upon one side of the washer. As clearly shown in Figs. 3 and 4, the circumferential edge of the flange 29 is oppositely tapered or is pointed as indicated at 30.

A second washer 26 is arranged upon the sleeve 28, this second washer engaging the opposite side of the flange 29 from that engaged by the first mentioned washer 26.

It will be seen that the adjacent annular V-shaped ribs 27 on the two washers 26 will seat in the complementary spaces provided by the pointed edge 30 of the flange 29 and the wall of the counterbore 20. The other annular V-shaped rib 27 of the second mentioned washer 26 will seat and mate with the V-shaped or pointed annular rib 16 of the flange 17 at the junction of the two recesses 13 and 14.

It will be noted that when the nut 18 with the two washers 26 and the sleeve 28 arranged as just above described, is screwed into the valve housing portion 12, that the washers will be firmly compressed and will provide an air-tight seal, thus leaving the aligned openings through the washers, the passage through the sleeve 28, and the bore 21 of the nut 18 as the only avenue for the passage of air through the chuck.

The valve 31 is provided with a head having a flange 32 extending outwardly and downwardly and formed on its under side with a substantially V-shaped groove 33. Projecting from the head is a pin 34 substantially circular in shape except for diametrically opposed flats 36 recessed in or offset as indicated at 35 from the circumference of the pin.

The valve is arranged with the head thereof located inwardly of the innermost gasket 26 so that the narrow under edge of the outwardly extending flange portion 32 will rest upon the gasket or washer 26 which in this instance forms a valve seat for the valve. The pin 34 of the valve has a sliding fit in the bore of the sleeve 28 while the flats 36 furnish a maximum passage for the air when the valve has been raised and the valve head unseated.

In assembling, the chuck washers or gaskets 26 are arranged in the counterbore 20 of the nut 18, the annular rib 27 of the gasket resting on the shoulder 22 fitting in the notch 25. The sleeve 28 is arranged in the central openings in the gaskets with the annular flange 29 extending between the gaskets, and the adjacent ribs 27 of the gaskets fitting the pointed or tapered end 30 of the flange. The valve 31 is positioned by passing the pin 34 through the sleeve 28 with the head 32 of the valve located above the uppermost gasket, the edge of the flange on the valve head resting upon the upper gasket 26, as clearly shown in Fig. 1. The nut may then be screwed into the valve housing portion 12 of the chuck until the uppermost gasket is engaged with the rib 16 of the valve housing portion 12 and the gaskets firmly compressed between the portion 12 and the nut 18.

Since the head of the valve is relatively large and extends over the innermost gasket 26 it will be seen that the pressure of the air or other fluid in the chuck line will maintain the valve in its seated position and thus prevent the escape of the fluid or air from the line.

When the chuck is applied to the valve stem of a pneumatic tire, the outer end of the pin 34 engages the pin of the valve insides thereby opening the valve insides to permit the passage of air therethrough, at the same time the tapered end of the pin 34 engages with the end of the valve stem and as the chuck is forced downward, so that the packing member 26 engages the end of the valve stem, the valve 31 will have been raised sufficiently to unseat the head 32 thereby allowing the air in the chuck line to pass through the opening in the gaskets and through the sleeve 28 and into the valve stem, it being remembered that the flats 36 on the valve pin 34 provide a maximum passage for the air.

It will be noted that the valve head 32 engages the innermost gasket 26 along the substantially knife-life edge and because of this fact the valve will be readily responsive to be unseated when the chuck is applied to a valve stem. When the chuck is removed from the valve stem, the head of the chuck valve being relatively large, presents sufficient surface so that the pressure in the chuck line will quickly and efficiently cause the valve to reseat.

It will be further noted that the movement of the chuck valve is positively guided in its seating and unseating displacements by the sliding engagement between the pin 34 and the sleeve 28.

It will be appreciated that the chuck disclosed and described herein is formed of a relatively few number of parts, of sturdy construction, which present little likelihood of becoming inoperative or out of order. It will further be appreciated that all of the parts may be readily and economically manufactured and that the parts of the chuck may be assembled with facility.

Although a preferred embodiment of the invention has been illustrated and described herein, it should be understood that the invention is susceptible of various modifications and adaptations within the scope of the appended claims.

Having thus described my invention, I claim:

1. An air chuck comprising a member provided with a chambered head and a stem portion extending therefrom and having a bore therethrough communicating with said chamber head, a second member secured to said first named member and having a counterbore communicating with the chambered head and with a reduced opening in said second member, a sleeve having an annular flange intermediate its ends and held in position in said counterbore by the said members and in alignment with said opening, and a valve slidably mounted in said sleeve and guided thereby and having a valve head within said chambered head.

2. An air chuck comprising a member provided with a chambered head, a second member secured to said first named member and having a counterbore communicating with the chambered head and with a reduced opening in said second member, a pair of annular washers having aligned central openings and clamped in the counterbore by said members, a sleeve positioned in the openings in said washers and having an annular flange extending therebetween, and a valve slidably mounted in said sleeve and guided thereby and having a valve head within said chambered head.

3. An air chuck comprising a member provided with a chambered head, a second member secured to said first named member and having a counterbore communicating with the chambered head and with a reduced opening in said second member, a pair of annular washers arranged in said counterbore and provided with aligned central openings, a sleeve positioned in the openings of said washers and having an annular flange extending between said washers, said washers and sleeve being clamped in position by said members, and a valve slidably mounted in said sleeve, said valve having a relatively large valve head within said chambered head adapted to seat on one of the washers, and a pin extending through said sleeve and into the opening in said second member and guided in its movements by said sleeve.

4. An air chuck comprising a member provided with a chambered head having therein an outwardly extending annular rib, a second member secured to said first named member and having a counterbore communicating with the chambered head and with a reduced opening in said second member, a pair of annular washers arranged in said counterbore and provided with aligned central openings, a sleeve positioned in the openings of said washers and having an annular flange extending between said washers, said washers and sleeve being clamped in position by said members and between said annular rib of the first named member and the bottom of the counterbore in the second named member, a valve slidably mounted in said sleeve, said valve having a relatively large valve head within said chambered head adapted to seat on one of the washers, and a pin extending through said sleeve and into the opening in said second named member and guided by said sleeve.

5. An air chuck comprising a member having a chambered head formed of a pair of recesses of different diameter and having an outwardly extending pointed annular rib at the junction of the two recesses, a second member secured to said first named member and having a counterbore communicating with the chambered head and with a reduced opening in said second member, the outer circumference of the bottom of said counterbore being provided with an annular notch, a pair of annular washers arranged in said counterbore and provided with aligned central openings and each having oppositely extending V-shaped ribs upon each of their circumferential edges, a sleeve positioned in the openings of said washers and having an annular flange extending between said washers with the outer edge of said flange tapered, said washers and sleeve being clamped in position by said members with the rib of one of the washers engaged in the notch of the second named member and a rib on another of the washers engaged by the rib in said chambered head, and a valve slidably mounted in said sleeve, said valve having a relatively large valve head within said chambered head adapted to seat on one of the washers, and a pin extending through said sleeve and into the opening in said second member and guided by said sleeve.

In testimony whereof, I hereunto affix my signature.

JOHN C. CROWLEY.